(12) United States Patent
Yamamoto

(10) Patent No.: US 10,511,398 B2
(45) Date of Patent: Dec. 17, 2019

(54) ELECTRONIC DEVICE FOR IMPROVING COOPERATION AMONG A PLURALITY OF MEMBERS

(71) Applicant: CASIO COMPUTER CO., LTD., Shibuya-ku, Tokyo (JP)

(72) Inventor: Futoshi Yamamoto, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/997,063

(22) Filed: Jun. 4, 2018

(65) Prior Publication Data
US 2018/0367231 A1 Dec. 20, 2018

(30) Foreign Application Priority Data
Jun. 20, 2017 (JP) .................... 2017-120575

(51) Int. Cl.
*G10H 1/40* (2006.01)
*H04J 3/06* (2006.01)
(Continued)

(52) U.S. Cl.
CPC ......... *H04J 3/0638* (2013.01); *G10H 1/0058* (2013.01); *G10H 1/40* (2013.01);
(Continued)

(58) Field of Classification Search
CPC .................................... H04J 4/80; G10H 1/40
(Continued)

(56) References Cited

U.S. PATENT DOCUMENTS 7,522,930 B2 * 4/2009 Inselberg ........... G06Q 30/0242
455/517
7,839,269 B2 * 11/2010 Steger ................ A63B 71/0686
340/407.1

(Continued)

FOREIGN PATENT DOCUMENTS

JP      H1172586 A    3/1999
JP      2011087794 A    5/2011
(Continued)

OTHER PUBLICATIONS

Japanese Office Action dated Aug. 6, 2019 (and English translation thereof) issued in counterpart Japanese Application No. 2017-120575.

*Primary Examiner* — David S Warren
(74) *Attorney, Agent, or Firm* — Holtz, Holtz & Volek PC

(57) ABSTRACT

An electronic device 10 that are wirelessly connected to other electronic devices within a range of a limited communication distance, and the device has a controller CNT that configured to determine at least one of whether or not there are a plurality of members who each have an electronic device within a predetermined range and whether or not a plurality of members who each have an electronic device show a same behavior, and to transmit, if it is determined that there are a plurality of members who each have an electronic device within the predetermined range, or that a plurality of members who each have an electronic device show a same behavior, a request to the plurality of electronic devices to generate rhythm signals at a same tempo to encourage improvement in cooperation among the plurality of members.

10 Claims, 4 Drawing Sheets

(51) Int. Cl.
*H04W 4/80* (2018.01)
*G10H 1/00* (2006.01)
*H04W 4/02* (2018.01)
*G10H 3/18* (2006.01)

(52) U.S. Cl.
CPC ............ *G10H 3/188* (2013.01); *H04W 4/023* (2013.01); *H04W 4/80* (2018.02); *G10H 2210/086* (2013.01); *H04W 4/027* (2013.01)

(58) Field of Classification Search
USPC .......... 84/713, 611, 612, 635, 636, 651, 652
See application file for complete search history.

(56) References Cited

U.S. PATENT DOCUMENTS

| | | | | |
|---|---|---|---|---|
| 8,093,995 B2* | 1/2012 | Steger | ................ | A63B 71/0686 340/407.1 |
| 8,324,492 B2* | 12/2012 | Feeney | .................... | A63H 5/00 446/175 |
| 8,378,795 B2* | 2/2013 | Steger | ................ | A63B 71/0686 340/407.1 |
| 9,079,058 B2 | 7/2015 | Sano | | |
| 9,545,542 B2* | 1/2017 | Binder | .................... | A63H 33/18 |
| 9,555,292 B2* | 1/2017 | Binder | .................... | A63H 33/18 |
| 9,592,428 B2* | 3/2017 | Binder | .................... | A63H 33/18 |
| 9,630,062 B2* | 4/2017 | Binder | .................... | A63H 33/18 |
| 9,757,624 B2* | 9/2017 | Binder | .................... | A63H 33/18 |
| 9,764,201 B2* | 9/2017 | Binder | .................... | A63H 33/18 |
| 2007/0256547 A1* | 11/2007 | Feeney | .................... | A63H 5/00 84/615 |
| 2009/0153350 A1* | 6/2009 | Steger | ................ | A63B 71/0686 340/4.2 |
| 2010/0079585 A1* | 4/2010 | Nemeth | ................ | H04N 13/337 348/54 |
| 2010/0207874 A1* | 8/2010 | Yuxin | .................... | G06F 3/017 345/156 |
| 2011/0121954 A1* | 5/2011 | Steger | ................ | A63B 71/0686 340/407.1 |
| 2011/0189942 A1* | 8/2011 | Inselberg | ............ | G06Q 30/0242 455/3.05 |
| 2011/0311955 A1* | 12/2011 | Forsten | .................. | G10H 1/368 434/247 |
| 2012/0126960 A1* | 5/2012 | Steger | ................ | A63B 71/0686 340/407.1 |
| 2012/0244969 A1* | 9/2012 | Binder | .................... | A63H 33/18 473/570 |
| 2014/0290360 A1* | 10/2014 | Binder | .................... | A63H 33/18 73/493 |
| 2014/0333211 A1* | 11/2014 | Oka | ........................ | G06F 3/014 315/159 |
| 2015/0262503 A1 | 9/2015 | Sano | | |
| 2016/0114221 A1* | 4/2016 | Binder | .................... | A63H 33/18 473/570 |
| 2016/0114256 A1* | 4/2016 | Binder | .................... | A63H 33/18 446/175 |
| 2016/0114257 A1* | 4/2016 | Binder | .................... | A63H 33/18 446/175 |
| 2016/0317874 A1* | 11/2016 | Binder | .................... | A63H 33/18 |
| 2017/0006356 A1* | 1/2017 | Krasadakis | ............ | G10L 15/18 |
| 2017/0087419 A1* | 3/2017 | Binder | .................... | A63H 33/18 |
| 2017/0087420 A1* | 3/2017 | Binder | .................... | A63H 33/18 |
| 2017/0087479 A1* | 3/2017 | Binder | .................... | A63H 33/18 |
| 2017/0151483 A1* | 6/2017 | Binder | .................... | A63H 33/18 |
| 2017/0182374 A1* | 6/2017 | Binder | .................... | A63H 33/18 |
| 2017/0182375 A1* | 6/2017 | Binder | .................... | A63H 33/18 |
| 2017/0182376 A1* | 6/2017 | Binder | .................... | A63H 33/18 |
| 2017/0323665 A1* | 11/2017 | Ikeda | ........................ | H04N 5/91 |
| 2018/0015333 A1* | 1/2018 | Binder | .................... | A63H 33/18 |
| 2018/0166053 A1* | 6/2018 | Turner | .................... | G10H 1/40 |
| 2018/0188850 A1* | 7/2018 | Heath | ................ | G06F 3/04847 |
| 2018/0272196 A1* | 9/2018 | Binder | .................... | A63H 33/18 |
| 2018/0339203 A1* | 11/2018 | Binder | .................... | A63H 33/18 |
| 2018/0367231 A1* | 12/2018 | Yamamoto | ............ | H04J 3/0638 |

FOREIGN PATENT DOCUMENTS

JP 2012199910 A 10/2012
WO 2013099629 A1 7/2013

* cited by examiner

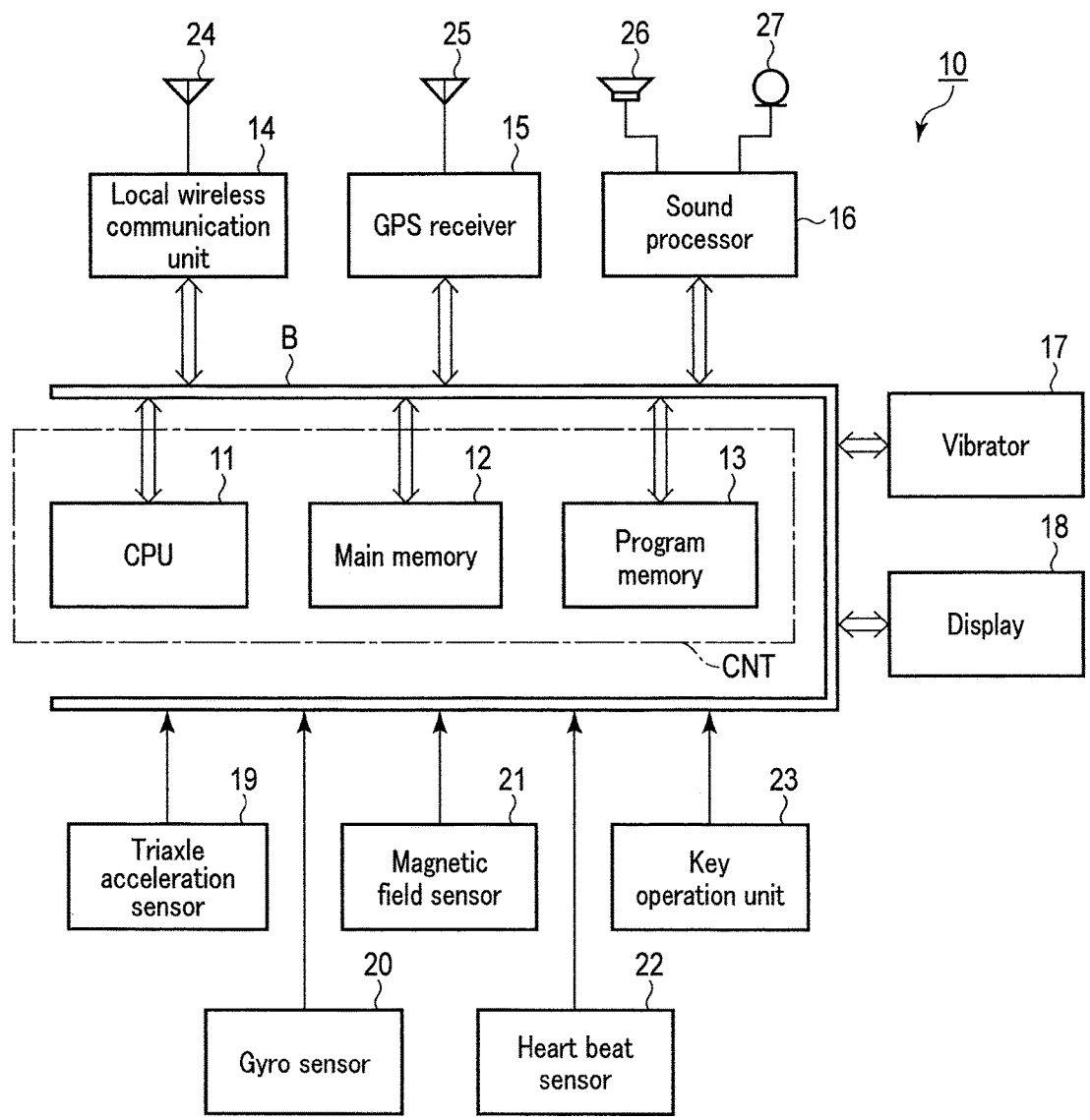
F I G. 1

ELECTRONIC DEVICE FOR IMPROVING COOPERATION AMONG A PLURALITY OF MEMBERS

CROSS-REFERENCE TO RELATED APPLICATION

This application is based upon and claims the benefit of priority from prior Japanese Patent Application No. 2017-120575, filed Jun. 20, 2017, the entire contents of which are incorporated herein by reference.

BACKGROUND OF THE INVENTION

1. Field of the Invention

The present invention relates to an electronic device for improving cooperation among a plurality of members.

2. Description of the Related Art

A technique of enabling a performer to play music or to dance without preparing a dedicated metronome or rhythm machine has been proposed (for example, Jpn. Pat. Appln. KOKAI Publication No. 11-072586).

In the technique disclosed in Jpn. Pat. Appln. KOKAI Publication No. 11-072586, a metronome function or a rhythm machine function, etc. is integrated to a watch, or the like.

BRIEF SUMMARY OF THE INVENTION

An electronic device to improve cooperation among a plurality of members, comprises: a processor; a storage unit that stores a program to be executed by the processor, wherein the processor performs, by the program stored in the storage unit, at least one of presence determining processing to determine whether or not there are a plurality of members who each have an electronic device within a predetermined range, and behavior determination processing to determine whether or not a plurality of members who each have an electronic device show a same behavior, and if it is determined in the presence determination processing that there are a plurality of members who each have an electronic device within the predetermined range, or if it is determined in the behavior determination processing that a plurality of members who each have an electronic device show the same behavior, the processor performs control processing to request a plurality of electronic devices to generate rhythm signals at a same tempo to encourage improvement in cooperation among the plurality of members.

BRIEF DESCRIPTION OF THE SEVERAL VIEWS OF THE DRAWINGS

FIG. 1 is a block diagram showing the functional arrangement of electronic circuitry of a rhythm transmitter according to an embodiment of the present invention.

DETAILED DESCRIPTION OF THE PREFERRED EMBODIMENTS

Figure 2:
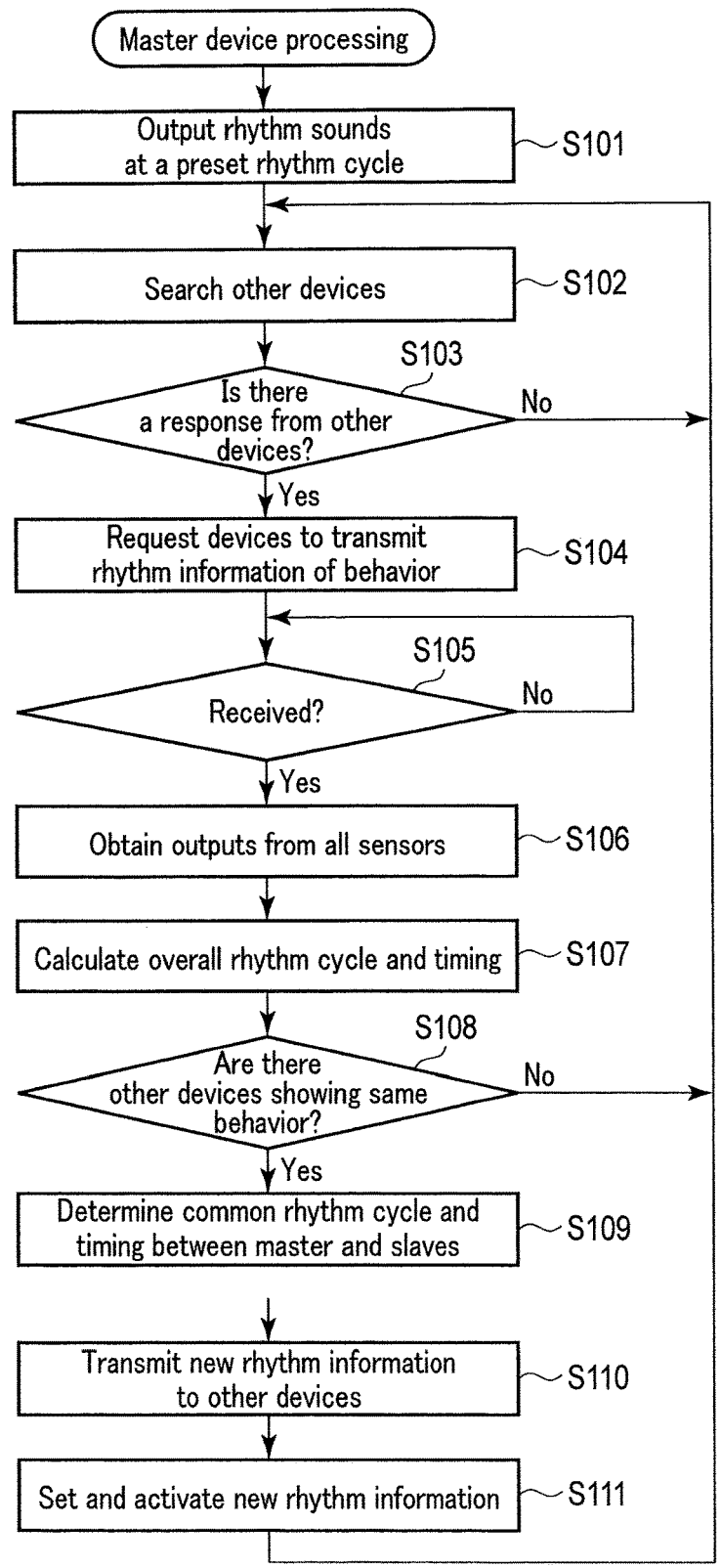
FIG. 2 is a flow chart showing the processing by a controller on the master device side in a first operation example according to the embodiment.

An embodiment in which the present invention is applied to a rhythm transmitter used for a practice of team sports, such as soccer, will be described below with reference to the drawings.

Configuration

FIG. 1 is a block diagram showing the functional arrangement of electronic circuitry of a rhythm transmitter 10 according to the embodiment. According to FIG. 1, the rhythm transmitter 10 operates in cooperation with a controller CNT which consists of a processor 11, a main memory 12, and a program memory 13.

In the controller CNT, the processor 11 reads operation programs and various fixed data stored in the program memory 13 constituted by a non-volatile memory, such as a flash memory, expands the operation programs or data in the main memory 12 consisting of an SRAM, and maintains it therein, and the processor 11 then successively executes the operation programs, thereby integrally controlling an operation, which will be described later.

To the controller CNT, a local wireless communication unit 14, a global positioning system (GPS) receiver 15, a sound processor 16, a vibrator 17, a display 18, a triaxial acceleration sensor 19, a gyro sensor 20, a magnetic field sensor 21, a heartbeat sensor 22, and a key operation unit 23 are connected, via a bus B.

The local wireless communication unit 14 of this rhythm transmitter 10 transmits and receives data through wireless connections with other rhythm transmitters having a similar configuration, using a local wireless antenna 24 incompliance with a local wireless communication standard, such as Bluetooth (registered trademark), as a range-limiting communication scheme, thereby sharing rhythm information with other rhythm transmitters 10.

Suppose the local wireless communication unit 14 herein is a Bluetooth (registered trademark) Class 1 unit capable of communicating with other rhythm transmitters within the range of 100 meters.

The GPS receiver 15 receives coming radio waves from a plurality of GPS satellites (not shown), using a GPS antenna 25, and calculates an absolute three-dimensional coordinate position (latitude/longitude/altitude) of a current position and a current time.

The sound processor 16 has a PCM sound source, for example, and drives the speaker 26 to amplify and emit a sound based on given sound data.

The speaker 26, instead of an ordinary speaker that outputs audible sounds, may be constituted by a vibrator that serves as a bone conduction speaker, and the vibrator is driven to vibrate. In this case, the vibrator is attached with a cable to the vicinity of the ear of a member who practices a sport wearing the rhythm transmitter 10, for example, a temple or an area behind the ear where there is relatively less subcutaneous fat, thereby allowing the member to directly hear the rhythm sounds through their inner ear, without affecting the member's hearing for surrounding sounds.

The sound processor 16 may be configured to extract and recognize only voice of a pre-registered speaker, for example, an instructor of members who use these rhythm transmitters 10 by performing, in cooperation with the controller CNT, filtering processing, and sound recognition processing on sound signals that are input from the microphone 27 and subjected to analog to digital conversion.

The vibrator 17 is constituted by a small motor in which an eccentric weight is attached to its rotational axis and a driver thereof, and the vibrator vibrates in synchronization with timing when a rhythm sound is output from the speaker 26, in accordance with a setting.

The display 18 has, for example, a red LED (light emitting diode), and lights the LED in synchronization with timing for outputting a rhythm sound that is output from the speaker 26, in accordance with the setting.

The triaxial acceleration sensor 19 detects acceleration in each of the three axes that are orthogonal to each other to detect attitude of the rhythm transmitter 10 (including a direction of gravitational acceleration) and a direction of given external force.

The gyro sensor 20 is constituted by a vibrational gyro scope, for example, and detects angular velocity to detect a degree of change in the attitude of the rhythm transmitter 10.

The magnetic field sensor 21 is constituted by, for example, a magnetoresistive effect element (MR sensor), and detects a magnetic north direction.

By combining outputs obtained by the detections at each of the triaxial acceleration sensor 19, the gyro sensor 20, and the magnetic field sensor 21, it is possible to obtain a behavior track in consideration of a direction based on autonomous navigation in a three-dimensional space, even when the rhythm transmitter is in an indoor environment where an absolute value of a current position cannot be detected by the GPS antenna 25 and the GPS receiver 15.

The heartbeat sensor 22 includes, for example, an electrocardiograph and a transmitter that are attached to the chest of a player who wears the rhythm transmitter 10, and receiving units thereof, and detects a heartbeat of the player in a real-time manner.

A matchbox-sized main body housing of the rhythm transmitter 10 can be stored in, for example, a pocket-shaped storing space on the inner side of the back of a soccer uniform, so that the rhythm transmitter 10 can be used without interfering with the members' practice to the greatest extent possible.

First Operation Example

An operation in slave devices will also be described herein, with reference to the processing of a rhythm transmitter 10 among a plurality of rhythm transmitters 10 attached to each member which is set as a master device during Bluetooth (registered trademark) pairing before a practice starts.

FIG. 2 is a flow chart showing the basic processing performed by the rhythm transmitter 10 which acts as a master device during a practice. At the beginning of the processing, the processor 11 generates rhythm sounds with the sound processor 16 and the speaker 26 based on a cycle and timing provided in preset rhythm information (step S101).

The generation of the rhythm sounds based on the preset rhythm information during this initial operation is also performed in the slave devices in a similar manner.

Subsequently, the processor 11 successively searches for current behaviors of the slave devices for which pairing is set in advance, using the local wireless communication unit 14 and the local wireless antenna 24 (step S102).

As a result of this search, it is determined whether any of the slave devices has responded or not (step S103).

If it is determined that there are no responses from the slave devices (No in step S103), the CPU 11 returns to the processing in step S101.

In step S103, if it is determined that there is a response from at least one slave device (Yes in step S103), the processor 11 then requests the slave device which has responded to transmit rhythm information of a behavior (step S104).

Suppose the rhythm information herein includes the following in the rhythm transmitter 10 of each slave device: a cycle of vertical movement which is calculated from an output of the triaxial acceleration sensor 19; a cycle and timing of an overall rhythm, which are derived from each vector length and a tendency of a vector direction when each of a turning position and a next turning position is regarded as a vector, and which are obtained by combining an output of the triaxial acceleration sensor 19 and outputs of the gyro sensor 20 and the magnetic field sensor 21; and data of a heartbeat rate based on an output from the heartbeat sensor 22.

The processor 11 waits for rhythm information to be transmitted from all the slave devices to which the request is made (step S105).

Then, when it is determined that rhythm information is transmitted from all the slave devices to which the request is made (Yes in step S105), the processor 11 obtains detected outputs from the triaxial acceleration sensor 19, the gyro sensor 20, the magnetic field sensor 21, and the heartbeat sensor 22 in the master device (step S106), and calculates a cycle and timing of an overall rhythm in the self-device in a manner similar to the above calculation carried out in the slave device (step S107).

Next, the processor 11 determines whether or not there are other slave devices used in a same sport or a same practice by checking whether or not a predetermined error range of rhythm information, for example, both of a rhythm cycle and timing, of a slave device obtained during a stand-by period in step S105 fall within 50% of the overall rhythm information that is calculated by the self-device (step S108).

Herein, it is determined that there are no slave devices used in a same sport or a same practice (No in step S108), the processor 11 returns to the processing in step S102 and repeats the processing.

In step S108, if it is determined that there is at least one slave device used in a same sport or a same practice (Yes in step S108), the processor 11 determines a cycle and timing, which are common between this slave device and the self-device, based on integrated calculation processing that is prepared in advance (step S109).

Then, the determined rhythm information is transmitted to the slave device via the local wireless communication unit 14 and the local wireless antenna 24 to set the determined rhythm information to the slave device (step S110).

Upon reception of the information, the rhythm transmitter 10 on the slave device side hereafter generates rhythm sounds by the sound processor 16 and the speaker 26 based on the received rhythm information.

Then, in the self-device which acts as a master device, the processor 11 similarly generates rhythm sounds from the sound processor 16 and the speaker 26 by setting the determined rhythm information (step S111).

A series of settings for sharing the rhythm sounds is thus finished, and the processing returns to step S102.

In the first operation example, it is thus possible to assist a team sport practice, share a rhythm among a plurality of team members, and improve cooperation among the team members, as described above.

In the present operation example, it is determined whether or not a same sport or same practice is performed based on a similarity between the rhythm information obtained in the self-device and the rhythm information obtained in the other devices by comparing the similarity with a predetermined threshold; thus, it is possible to reliably exclude other people who are in the same communication area and use the same practice place but play a different sport or perform a different practice, and to practice with an attempt to improve cooperation more efficiently.

Second Operation Example

In this example, processing in a case where a rhythm transmitter 10, among a plurality of rhythm transmitters 10 worn by the members, which is held and attached to a member who takes a leadership position, for example, a member who is a captain, etc., is set as a master device when pairing is set using Bluetooth (registered trademark) before a practice, will be described, along with an operation in the slave devices.

The following explanation will be given on the assumption that the rhythm transmitters 10, which act as a slave device, are present within a local wireless communication range where the rhythm transmitter 10 that acts as a master device is present, and the rhythm transmitters 10 are used in a same sport and a same practice, and only the processing for adjusting rhythm information will be explained.

Figure 3:
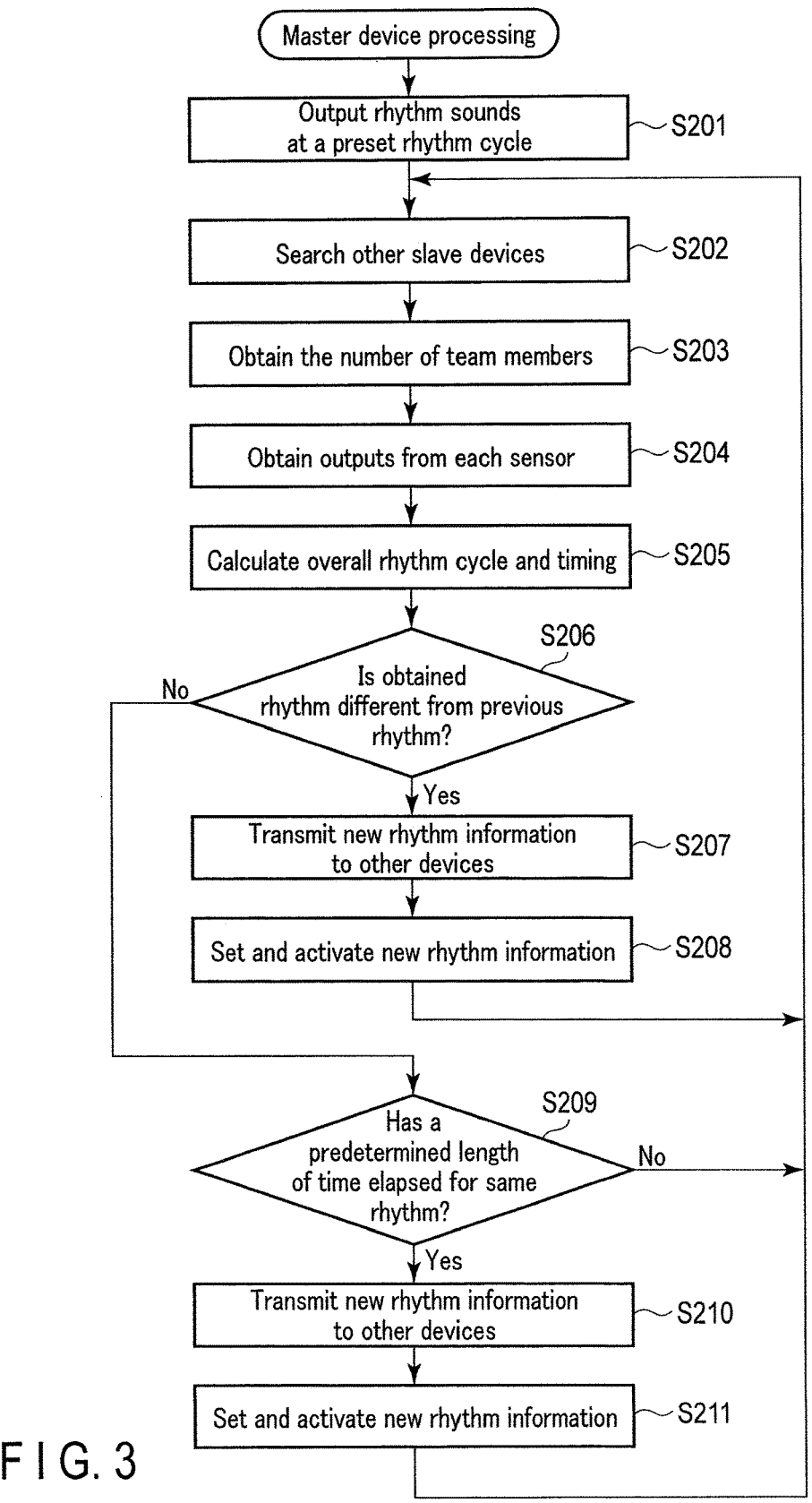
FIG. 3 is a flow chart showing the processing by a controller on the master device side in a second operation example according to the embodiment.

FIG. 3 is a flow chart showing the basic processing performed by the rhythm transmitter 10 which acts as a master device during a practice. At the beginning of the processing, the processor 11 generates rhythm sounds with the sound processor 16 and the speaker 26, based on a cycle and timing provided in preset rhythm information (step S201).

The generation of the rhythm sounds based on the preset rhythm information during this initial operation is also performed in the slave devices in a similar manner.

Subsequently, the processor 11 successively searches for current behaviors of the slave devices for which pairing is set in advance, using the local wireless communication unit 14 and the local wireless antenna 24 (step S202).

As a result of this search, the number of slave devices is obtained as the number of members in the team (step S203). Subsequently, the processor 11 obtains detected outputs of the triaxial acceleration sensor 19, the gyro sensor 20, the magnetic field sensor 21, and the heartbeat sensor 22 of the self-device acting as a master device (step S204), and calculates a cycle and timing of an overall rhythm in the self-device (step S205).

Next, the processor 11 determines whether a rhythm of a member who wears the rhythm transmitter 10 acting as a master device has changed or not based on whether or not the overall rhythm information calculated in the self-device is different from the rhythm information that was set in a previous cycle (step S206).

Herein, if it is determined that the overall rhythm information calculated in the self-device is the same as the rhythm information that was set in the previous cycle, and that the rhythm of the member who wears the rhythm transmitter 10 acting as a master device has not changed (No in step S206), the processor 11 then determines whether a predetermined length of time, for example, ten minutes, has elapsed or not since the current rhythm began (step S209).

If it is determined that the predetermined length of time has not yet elapsed since the current rhythm began (No in S209), the processor 11 returns to the processing in step S202, and keeps generating rhythm sounds with the same cycle and timing.

In step S209, if it is determined that the predetermined length of time has elapsed since the rhythm began (Yes in S209), the processor 11 transmits other preset rhythm information to all the slave devices via the local wireless communication unit 14 and the local wireless antenna 24 so that the information is newly set in the slave devices (step S210).

Upon reception of the new information, each of the rhythm transmitters 10 on the slave device side generates rhythm sounds by the sound processor 16 and the speaker 26 based on the new rhythm information.

Then, in the self-device which acts as a master device, the processor 11 similarly generates rhythm sounds from the sound processor 16 and the speaker 26 by setting the new rhythm information (step S211).

A series of setting for sharing the rhythm sounds is thus finished, and the processing returns to step S202.

In step S206, if it is determined that the overall rhythm information calculated in the self-device is different from the rhythm information that was set in the previous cycle, and that the rhythm of the member who wears the rhythm transmitter 10 acting as a master device has changed (Yes in step S206), the processor 11 transmits the new rhythm information to all the slave devices via the local wireless communication unit 14 and the local wireless antenna 24, so that the slave devices are synchronized with the rhythm information of the master device (step S207).

Then, in the self-device which acts as a master device, the processor 11 similarly generates rhythm sounds from the sound processor 16 and the speaker 26 by setting the newly-detected rhythm information (step S208).

A series of settings for sharing the rhythm sounds that follow the master device is thus finished, and the processing returns to step S202.

In the second operation example, the rhythm information detected in the rhythm transmitter 10 acting as a master device is prioritized when controlling the transmission of rhythm information in the slave devices, as described above; therefore, appropriate selection of a master device leads to efficient improvement in the cooperation in the team.

In the above description, soccer is used as an example of a team sport. In a case of a bicycle road race performed by a plurality of team members, if a main team member wears a rhythm transmitter 10 acting as a master device, and each assistant member wears a rhythm transmitter 10 acting as a slave device, a rhythm can be referred to from body movement (cadence, or a crank rotation speed) of the main member, and a cycle of the rhythm can be transmitted to the assist members, so that the team can appropriately deal with a gradual change per time in speed, and safer group bicycling can be achieved.

Furthermore, when a predetermined length of time has elapsed for a same rhythm, a cycle of the rhythm (tempo), etc. may be changed as described above, so as to avoid the rhythm of an entire team becoming dull, and a further improvement in cooperation, including improvement in capability to deal with various rhythms, can be sought.

In the present operation example, a case where the rhythm is changed in accordance with a length of time elapsed after the rhythm was once set is explained; however, the present embodiment is not limited to this case. For example, the rhythm may be changed when a predetermined voice of an instructor is extracted using the microphone 27 and the sound processor 16, or when a manual key operation, etc. is input to key operation unit 23 in the rhythm transmitter 10 acting as a master device.

Third Operation Example

In this example, processing in a case where a rhythm transmitter 10, among a plurality of rhythm transmitters 10 attached to the members, which is held and attached to a member who plays a main role in defense and offense, for example, a midfielder in soccer, is set as a master device when pairing is set using Bluetooth (registered trademark) before a practice starts, will be described, along with an operation in the slave devices.

The following explanation will be given on the assumption that the rhythm transmitters 10, which act as a slave device, are present within a local wireless communication range where the rhythm transmitter 10 that acts as a master device is present, and the rhythm transmitters 10 are used in a same sport and a same practice, and only the processing for adjusting rhythm information will be explained.

In addition, a sport in this example will be described on the assumption that positions of most of the team members will be moved within a practice range in accordance with switching between defense and offense, and the directions of defending and attacking and the coordinate information (latitude/longitude) in the practice range mainly along the horizontal plane are preset, and whether the team is in on offense or on defense can be determined from a center of mass known by integrating the positions of the members.

Figure 4:
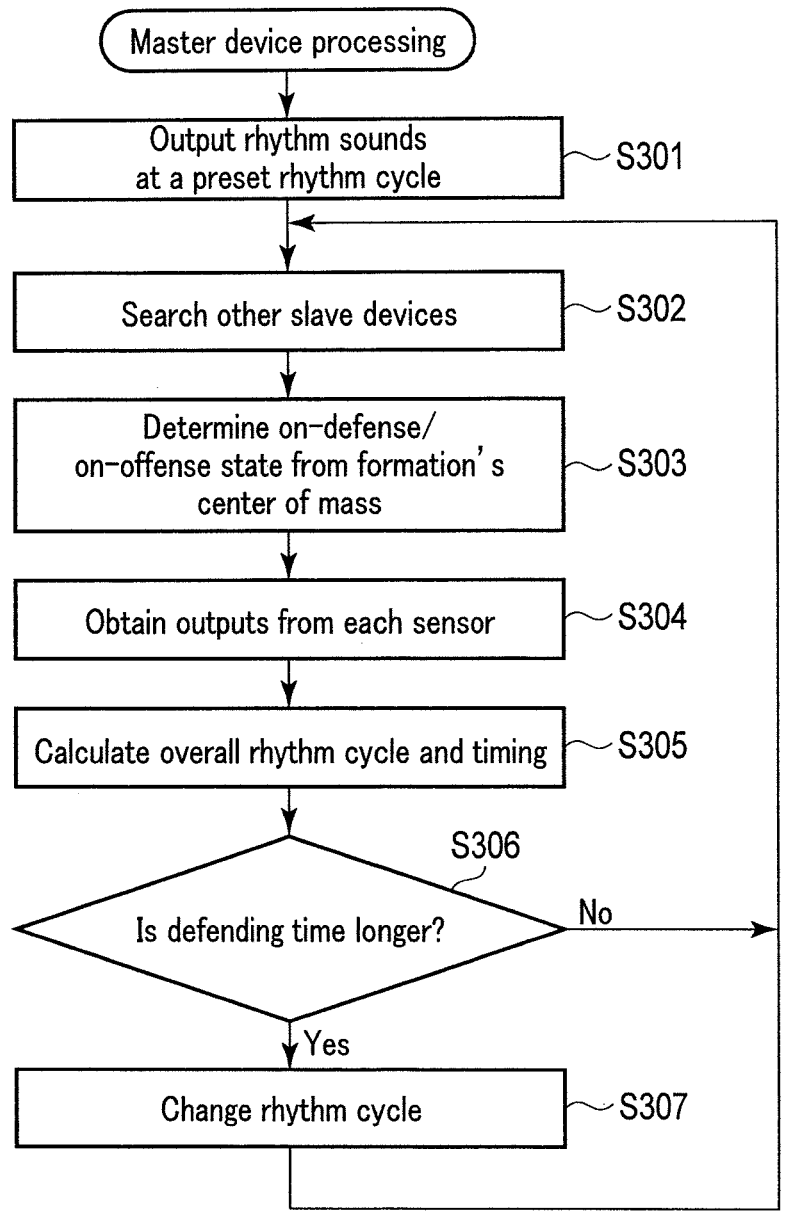
FIG. 4 is a flow chart showing the processing by a controller on the master device side in a third operation example according to the embodiment.

FIG. 4 is a flow chart showing the basic processing performed by the rhythm transmitter 10 which acts as a master device during a practice. At the beginning of the processing, the processor 11 generates rhythm sounds with the sound processor 16 and the speaker 26 based on a cycle and timing provided in preset rhythm information (step S301).

The generation of the rhythm sounds based on the preset rhythm information during this initial operation is also performed in the slave devices in a similar manner.

Subsequently, the processor 11 successively searches for position information of the slave devices for which pairing is set in advance, using the local wireless communication unit 14 and the local wireless antenna 24 (step S302).

As a result of the search, it is determined, from a center of mass of the slave devices spread out on the practice range, whether the team is on offense or on defense (step S303).

At this time, the balance may be calculated by performing average value calculating processing on position information, assuming that all the members in the team are equal.

On the other hand, determination of whether the team is on offense or on defense may be made in a variety; for example, position-oriented weighting (i.e., weighting the members differently in accordance with their positions, such as midfielder, forward, and defender in soccer) when either defending or attacking is more preferred than the other in a practice, and individual-oriented weighting (i.e., weighting a key member in attacking or defending may be weighted more heavily than the other members) may be adopted.

Subsequently, the processor 11 obtains detected outputs of the triaxial acceleration sensor 19, the gyro sensor 20, the magnetic field sensor 21, and the heartbeat sensor 22 of the self-device acting as a master device (step S304), and calculates a cycle and timing of an overall rhythm in the self-device (step S305).

Next, the processor 11 determines, from a result of the determination in step S303, whether a length of time during which the team is in a defensive state is longer than that in an offensive state, within a predetermined length of time that is immediately before a predetermined time, for example within five minutes (step S306).

Herein, if it is determined that the offensive time is longer than the defensive time (No in step S306), the processor 11 assumes that the currently-set rhythm is correct, and the processing returns to step S302, and keeps generating rhythm sounds with the same cycle and timing.

If it is determined that the on-defense time is longer than the on-offense time (Yes in step S306), the processor 11 sets new rhythm information to change the rhythm information of the entire team (step S307). Specifically, the processor 11 transmits an instruction to change to the new rhythm information to all of the slave devices at once via the local wireless communication unit 14 and the local wireless antenna 24, and also sets the new rhythm information in the self-device acting as a master device to cause the self-device to generate rhythm sounds using the sound processor 16 and the speaker 26.

A series of processing to set new rhythm sounds in accordance with the on-defense/on-offense state as appropriate is finished herein, and the processing returns to step S302 again.

In the third operation example, it is determined whether the team is on offense or on defense in accordance with the positions of the team members, and a cycle (tempo), etc. of a rhythm is changed in accordance with a determination result, as described above; thus, the members can naturally learn a rhythm under favorable conditions, and an improvement in competitiveness and cooperation can be sought.

In the above embodiment, a rhythm is output by sound, using the sound processor 16 and the speaker 26; however, it is also possible to make the rhythm sounds visually recognizable for the members by flashing a red LED used in the display 18 in synchronization with the rhythm sounds.

Thus, it is also possible to configure an image processing system that takes pictures from a bird-eye position to cover all the practice range, for example, from the air using a drone, to make a qualitative determination from pictures on a progress in the process of reinforcing cooperation among members.

In the above embodiment, a rhythm is set in accordance with the position and movement of each rhythm transmitter 10; however, in addition to this example, since it is possible to know an exercise load imposed on a member who wears the rhythm transmitter 10 by checking the heart rate from an output of the heartbeat sensor 22, a rhythm may be set in consideration of the load.

For example, if an interval training in which a light-load exercise and a heavy-load exercise for a predetermined length of time are repeated alternately, so that the average of the heart rates of the members falls within the range of 120 to 180 beats per minute, a rhythm may be set in accordance with the strength of the exercise load, thereby providing a practice that not only improves member cooperation, but also reinforces cardiopulmonary function through a natural and easy-to-understand way.

As for the rhythm information in the above embodiment, data for generating the rhythm may be transmitted from a master device to a slave device, and the rhythm may be generated from a rhythm generator on the slave side, using the received data, or audio data of the rhythm sounds generated from the master device may be transmitted to a slave device and the received audio data may be reproduced on the slave side with the speaker 26.

In the above embodiment, an example where a master device and slave devices are worn by players themselves is described; however, the master device may be held by a coach or a head coach and the slave devices may be worn by the players, and the coach or head coach may transmit predetermined rhythm information from their master device to the slave devices worn by the players.

The present embodiment is applied to a specific team sport in the above description; however, the present invention is applicable to any type of team sport.

Bluetooth (registered trademark) is used as an example of a local wireless communication scheme where a communication range is limited; however, the present invention does not limit communication schemes.

Furthermore, in the above embodiment, whether or not a plurality of rhythm transmitters 10 are present within a predetermined range is determined depending on whether or not there is a communication response in a local wireless communication scheme with a limited communication range; however, the presence of a plurality of rhythm transmitters 10 may be determined by a different method. In this case, the rhythm transmitter 10 has a measurement means for determining a current position, for example, and it can be determined whether a plurality of rhythm transmitters 10 are present or not within a predetermined range based on the position information of each rhythm transmitter 10.

In the above embodiment, if a plurality of rhythm transmitters 10 are present within a predetermined range and they show a same behavior, the rhythm transmitters 10 are requested to generate a rhythm signal of the same tempo. At least when either a plurality of rhythm transmitters 10 are present within a predetermined range or when they show a same behavior, the rhythm transmitters 10 may be requested to generate a rhythm signal of the same tempo.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device, said electronic device comprising:
    a processor; and
    a storage that stores a program executable by the processor,
    wherein the processor, under control of the program stored in the storage, performs processing comprising:
    presence determining processing to determine whether or not a plurality of members who are each in possession of an electronic device are present within a predetermined range;
    behavior determination processing to determine whether or not a plurality of members who are each in possession of an electronic device play a same team sport; and
    in response to (i) determining in the presence determination processing that a plurality of members who are each in possession of an electronic device are present within the predetermined range, and (ii) determining in the behavior determination processing that a plurality of members who are each in possession of an electronic device play the same team sport, control processing to request a plurality of electronic devices, each of which is in the possession of one of the plurality of members, to generate rhythm signals at a same tempo to encourage improvement in cooperation among the plurality of members.

2. The electronic device according to claim 1, wherein:
    the presence determination processing is performed to determine whether or not there is a member who is in possession of an electronic device other than said electronic device within the predetermined range,
    the behavior determination processing is performed to determine whether or not a member who is in possession of an electronic device other than said electronic device plays a same team sport as a member who is in possession of said electronic device, and
    the control processing is performed to request the electronic device other than said electronic device to generate rhythm signals at the same tempo in response to (i) determining in the presence determination processing that there is a member who is in possession of an electronic device other than said electronic device within the predetermined range, and (ii) determining in the behavior determination processing that the member who is in possession of an electronic device other than said electronic device plays the same team sport as the member who is in possession of said electronic device.

3. The electronic device according to claim 1, wherein:
    said electronic device comprises a detecting unit that detects a plurality of pieces of environment information including an external force applied to said electronic device, and
    the control processing is performed to determine a tempo based on the plurality of pieces of environment information detected by the detecting unit, and to request generation of the rhythm signals at the same tempo.

4. The electronic device according to claim 3, wherein the environment information includes a position coordinate in a three-dimensional space, an acceleration, an angular velocity, a magnetic field, and a heart rate of a member who is in possession of said electronic device.

5. The electronic device according to claim 1, wherein the request transmitted in the control processing to request generation of the rhythm signals includes a request to generate at least one of sound, vibration, and light.

6. The electronic device according to claim 1, wherein in response to determining that a predetermined length of time has elapsed since a last request to generate rhythm signals at the same tempo was made, the control processing requests generation of rhythm signals of a new tempo different from the same tempo.

7. The electronic device according to claim 1, wherein the control processing requests generation of rhythm signals of a new tempo different from the same tempo in response to detecting a change in the same team sport.

8. The electronic device according to claim 1, wherein:
    the same team sport is a team sport in which participants switch between defense and offense, and
    the control processing comprises requesting an electronic device to generate rhythm signals at a new tempo different from the same tempo in response to a determination that a time spent on defense is longer than a time spent on offense.

9. A method of rhythm information notification in an electronic device, the method comprising:
    determining whether or not a plurality of members who are each in possession of an electronic device are present within a predetermined range;
    determining whether or not a plurality of members who are each in possession of an electronic device play a same team sport; and
    in response to determining that (i) a plurality of members who are each in possession of an electronic device are present within the predetermined range and (ii) a plurality of members who are each in possession of an electronic device play the same team sport, requesting a plurality of electronic devices, each of which is in possession of one of the plurality of members, to generate rhythm signals at a same tempo to encourage improvement in cooperation among the plurality of members.

10. A non-transitory computer-readable storage medium storing a program executable by a computer integrated in an electronic device, the program controlling the computer to perform functions comprising:
  determining whether or not a plurality of members who are each in possession of an electronic device are present within a predetermined range;
  determining whether or not a plurality of members who are each in possession of an electronic device play a same team sport; and
  in response to determining (i) that a plurality of members who are each in possession of an electronic device are present within the predetermined range, and (ii) that a plurality of members who are each in possession of an electronic device play the same team sport, requesting a plurality of electronic devices, each of which is in the possession of one of the plurality of members, to generate rhythm signals at a same tempo to encourage improvement in cooperation among the plurality of members.

* * * * *